United States Patent [19]

Toelle

[11] Patent Number: 4,640,308
[45] Date of Patent: Feb. 3, 1987

[54] FLUID CONTROL VALVE

[75] Inventor: Alvin D. Toelle, Fenton, Mich.

[73] Assignee: Ex-Cell-O Corporation, Troy, Mich.

[21] Appl. No.: 634,255

[22] Filed: Jul. 25, 1984

[51] Int. Cl.[4] .............................................. F16K 11/14
[52] U.S. Cl. ............................ 137/596.18; 137/596.1;
 137/864; 137/869
[58] Field of Search ...................... 137/596.16, 596.18,
 137/596.1, 596.2, 864, 869, 871, 596

[56] References Cited

U.S. PATENT DOCUMENTS

| 2,184,413 | 12/1939 | Della Chiesa et al. | 137/596.1 |
| 3,198,479 | 8/1965 | Greenwood | 251/205 X |
| 4,526,197 | 7/1985 | Martin et al. | 137/596.2 |
| 4,530,487 | 7/1985 | Tew et al. | 251/138 |

FOREIGN PATENT DOCUMENTS

| 368031 | 4/1963 | Switzerland | 137/596.2 |
| 848712 | 7/1981 | U.S.S.R. | 137/596.18 |

Primary Examiner—Gerald A. Michalsky
Attorney, Agent, or Firm—Edward J. Timmer

[57] ABSTRACT

For application in controlling fuel flow to a gas turbine engine, the control valve includes one or more fuel inlet manifolds, a fuel outlet manifold and a fuel drain manifold in fuel flow relation with a longitudinal bore in a valve sleeve. A hollow spool valve is slidably disposed in the sleeve bore and includes a metering valve thereon movable past a fuel inlet aperture to meter fuel flow from the fuel inlet manifold to the fuel outlet manifold. The spool valve also includes a shut-off valve thereon for terminating fuel flow to the fuel outlet manifold under certain conditions. The hollow spool valve includes a longitudinal bore in fuel flow relation with the fuel outlet manifold and fuel drain manifold and a drain valve in the spool bore openable when fuel flow to the fuel outlet manifold is interrupted by the shut-off valve so that fuel can drain from the fuel outlet manifold to the drain manifold and closeable during metered fuel flow to the fluid outlet manifold. The drain valve preferably includes a drain valve assembly in the spool bore movable with the spool valve and an unseating member in the spool bore in fixed position engageable with the valve member of the drain valve assembly to unseat same when the shut-off valve is closed by sliding movement of the spool valve.

23 Claims, 6 Drawing Figures

FLUID CONTROL VALVE

FIELD OF THE INVENTION

The present invention relates to fluid flow control valves and, in particular, to fuel control valves especially useful for controlling fuel flow to a gas turbine engine.

BACKGROUND OF THE INVENTION

Fuel control systems proposed for advanced gas turbine engines under digital electronic control employ a fuel flow path fuel metering valve, a dual flow sensor and a shut-off and drain valve as separate components in series between the fuel pump and fuel manifold supplying fuel to the combustors of the gas turbine engine.

In the past, other fuel control systems have combined a fuel metering valve and shut-off and drain valve in a housing along with a fuel-actuated or hydro-mechanical back-up control arrangement.

SUMMARY OF THE INVENTION

The present invention contemplates a fluid control valve having fluid flow metering valve means, positive fluid flow shut-off valve means and fluid drain valve means arranged operatively in a compact, simple unit.

It is an object of the invention to provide such a fluid control valve in which the valve housing means includes a fluid inlet means, fluid outlet means and fluid drain means in fluid flow relation with a longitudinal bore through the valve housing means.

It is yet another object of the invention to provide such a fluid control valve which includes a hollow valve having a metering valve means, shut-off valve means and drain valve means to control fluid flow.

It is still another object of the invention to provide the hollow valve with a longitudinally-extending metering valve slidable past the fluid inlet means to meter fluid flow.

It is still another object of the invention to provide the hollow valve with a seal thereon engageable with a sealing surface on the valve housing means to positively shut off fluid flow to the fluid outlet means under certain conditions.

It is still another object of the invention to provide the hollow valve with a longitudinal bore therein connected in fluid flow relation to the fluid outlet means and fluid drain means.

It is another object of the invention to provide a drain valve means in the valve bore openable to allow fluid to drain from the fluid outlet means to the fluid drain means when fluid flow is terminated to the fluid outlet means and closeable during metered fluid flow thereto.

In a typical working embodiment of the invention, the fluid control valve comprises a valve housing means having a longitudinal bore with a fluid inlet means, fluid outlet means and fluid drain means in fluid flow relation therewith and a hollow spool valve means slidably disposed in the housing bore. The spool valve means preferably includes a land forming a fuel control bore portion in fluid flow relation with the fluid inlet means and fluid outlet means. The spool valve means itself includes a longitudinal spool bore in fluid flow relation with the fluid outlet means and fluid drain means and with a drain valve means in the spool bore. The spool valve means further includes a metering valve means slidable past the fluid inlet means to meter fluid and a fluid shut off valve means to terminate fluid flow to the fluid outlet means. The fluid drain valve means in the bore of the spool valve means is openable to permit fluid drainage from the fluid outlet means to the fluid drain means when the shut-off valve means terminates fluid flow to the fluid outlet means and is closeable during metered fluid flow thereto. Means are provided to slide the spool valve means in the bore of the valve housing means to control fluid flow.

In a preferred embodiment of the invention, the drain valve means includes a drain valve assembly having a valve member, valve seat and spring urging the valve member closed against the seat and further includes an unseating member disposed in the spool bore in fixed position relative to drain valve assembly and spool valve means and engageable with the valve member to unseat same and open the drain valve means when fluid flow to the fluid outlet means is terminated by sliding the spool valve means so that fluid can drain to the fluid drain means through the spool bore.

In another preferred embodiment, the metering valve means extends longitudinally from the spool valve means in sliding fit in the housing bore for sliding past the fluid inlet means.

In another preferred embodiment, the shut-off valve means includes an O-ring seal carried on the spool valve means and engageable with a sealing surface on the valve housing means by sliding of the spool valve means.

In still another preferred embodiment, dual fluid inlet means are provided to receive dual independent fluid flows and both are in fluid flow relation with the housing bore and both are metered by dual metering valve means on the spool valve means.

In other preferred embodiments, the means for sliding the spool valve means in the housing bore includes piston means on opposite ends of the spool valve means subjected to control fluid pressures from an external fluid servovalve actuator and further may include spring means in the housing bore biasing the spool valve means in the direction to close the shut-off valve means to terminate fluid flow to the fluid outlet means.

These and other features, objects and advantages of the invention will become apparent from the following description taken with the following drawings.

DESCRIPTION OF PREFERRED EMBODIMENTS

Figure 1:
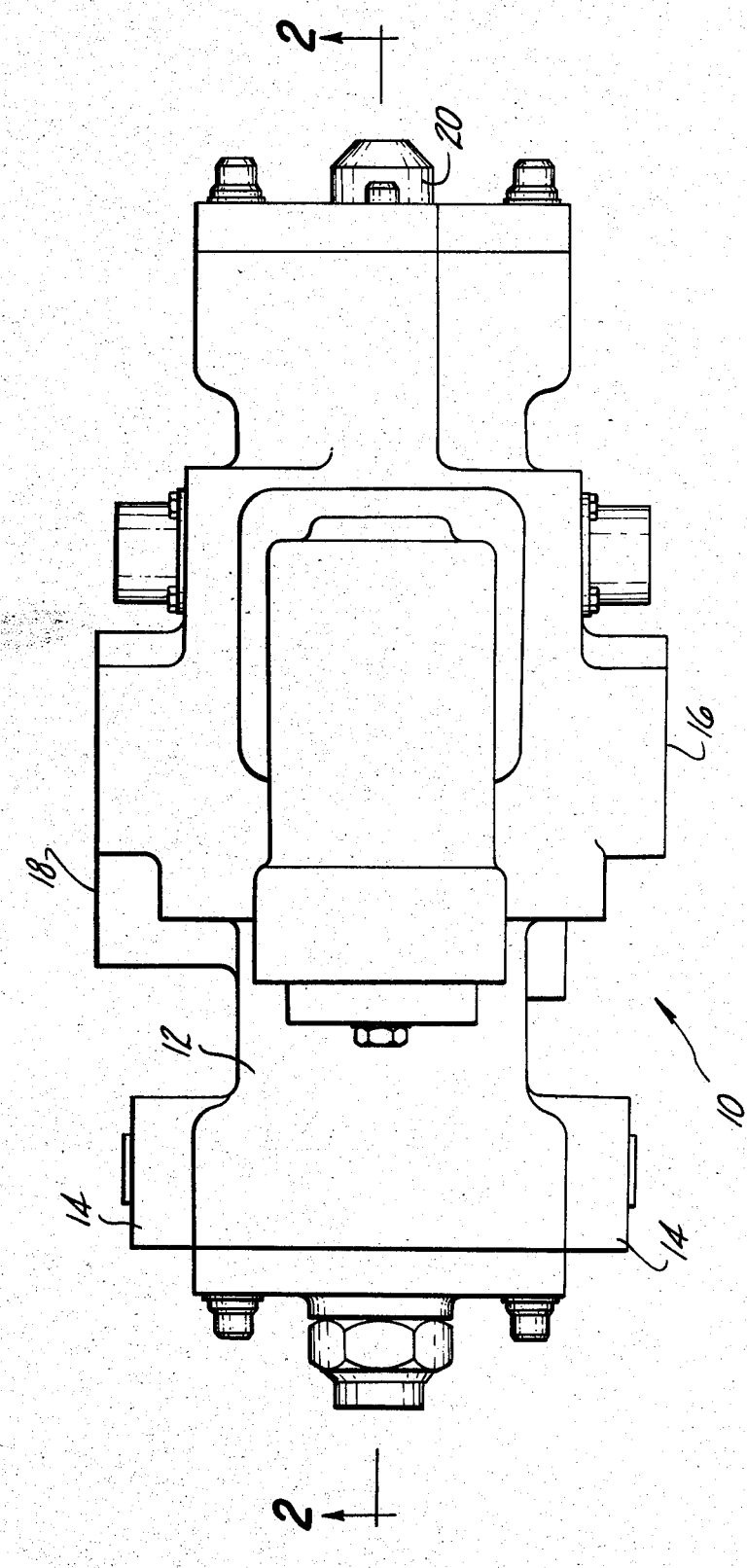
FIG. 1 is a top elevation of a fluid control valve of the invention.
Figure 2:
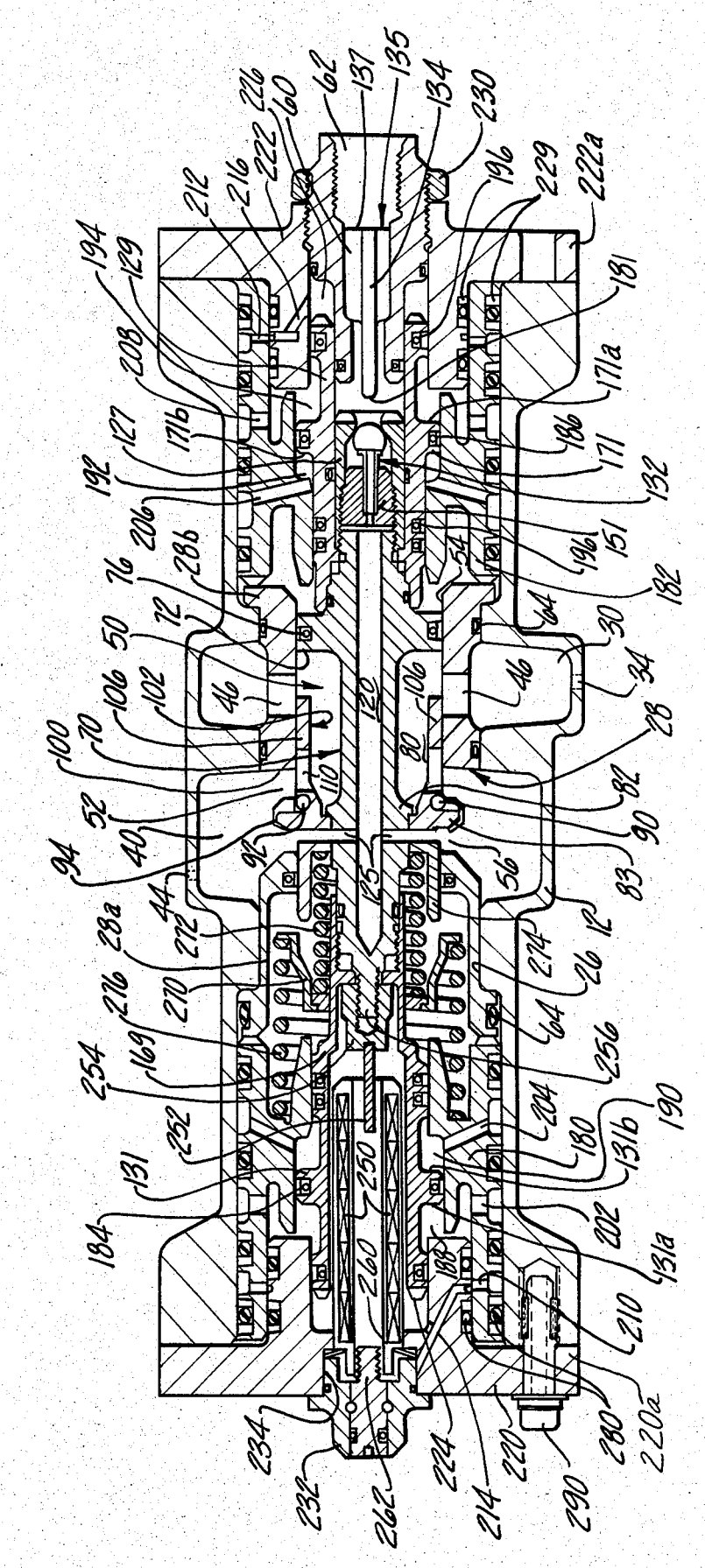
FIG. 2 is a longitudinal cross-sectional view of the control valve along line 2—2 of FIG. 1.
Figure 3:
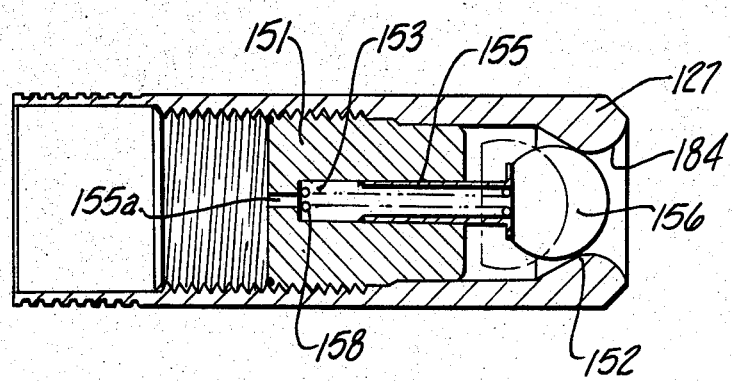
FIG. 3 is an enlarged partial cross-sectional view of the drain valve means.

FIGS. 1-3 illustrate a fuel flow control valve construction in accordance with the present invention for particular use in controlling fuel flow to the combustors of a gas turbine engine, although the inventive flow control valve may be used in other fluid flow control applications.

In FIG. 1, the fuel control valve 10 is shown having a valve body or housing 12 with flanges 14 by which the valve can be mounted on the gas turbine engine. The valve housing includes a fuel inlet fitting 16 for connection to a fuel pumps (not shown) providing fuel flow to the valve. The valve housing also includes a fuel outlet fitting 18 for connection via suitable flow lines or conduits to fuel nozzles in the combustion section of the gas turbine engine as is well known. Also on the valve housing or body 12 is an overboard drain fitting 20 for effecting drainage of fuel from the fuel manifold to the outside of the valve under engine shut-down or other conditions.

FIG. 2 illustrates the inner structure of the fuel control valve in detail. It is apparent that the valve housing or body 12 has a longitudinal bore 26 therein in which is received a valve sleeve 28. The housing bore 26 and outer periphery of the valve sleeve 28 are complementary configured at spaced locations along the housing bore 26 to form an annular fuel inlet manifold 30 which is in fuel flow relation with fuel inlet fitting 16 by means of suitable passage 34 and an annular fuel outlet manifold 40 which is in fuel flow relation with the fuel inlet manifold 30 as permitted by the spool valve 50 and with the fuel outlet or discharge fitting 18 via passage 44. The valve sleeve 28 includes multiple fuel inlet apertures 46 and an annular fuel outlet slot 52 in fuel flow communication with the respective inlet and outlet manifold. The valve sleeve 28 also includes an annular fuel drain slot 56 in fuel flow relation with the fuel outlet manifold 40. Slots 52 and 56 are actually one and the same and formed between separate sleeve portions 28a,28b. The overboard fuel drain fitting 20 includes axial slots or passages 60 in fuel flow relation at the upstream end with the fuel outlet manifold 40 via outlet aperture 52 when fuel flow is positively shut off as will be described more fully hereinbelow and opening into drain chamber or manifold 62 in the fitting 20 at the other downstream end. Multiple seals 64 are provided on valve sleeve 28 to prevent unwanted fuel and hydraulic fluid leakage.

As is apparent, spool valve 50 is positioned in sliding fit in the valve sleeve bore 54. The spool valve includes a central fuel control portion 70 bounded on one side by a radially-extending large diameter land 72 in sliding fit in the valve sleeve bore 54 as shown. The land 72 has a seal 76 thereon to aid in preventing fuel leakage from a fuel control bore portion 80 defined between land 72 and a radial shoulder 82 on the spool valve 50. It is apparent that the fuel control bore portion 80 is in fuel flow relation with the fuel inlet manifold 30 through inlet apertures 46 and fuel outlet manifold 40 through outlet slot 52 when the spool valve is in the position shown in FIG. 2.

Held against the radial shoulder 82 of the valve spool is an annular valve member 83 which includes a resilient O-ring seal 90 in circumferential groove 92 on the shoulder with the O-ring seal held in the groove by a retainer ring 94. The O-ring seal is engageable against a sealing surface 100 on the valve sleeve 28 to provide a positive seal to shut off fuel flow from the fuel control bore portion 80 to the fuel inlet manifold 40 when the spool valve is slid to the right in FIG. 2 as will be described hereinbelow.

The valve member 83 also carries multiple arcuate extensions 102 extending longitudinally therefrom in cantilever fashion. The extensions each include an arcuate metering valve portion 106 slidable in close fit in valve sleeve bore 54 past the fuel inlet apertures 46 to meter fuel therethrough. Each extension also includes a secondary aperture 110 to provide a flow path for fuel from the fuel control bore portion 80 to the fuel outlet manifold.

The central fuel control portion 70 of the valve spool includes a longitudinal bore 120 which is in fuel flow relation with the fuel outlet manifold 40 via the fuel drain slot 56 in the valve sleeve and multiple circumferentially spaced fuel drain apertures 125 in the valve spool. Fuel thus can flow or drain from the fuel outlet manifold 40 into the spool valve bore 120. A hollow spool valve extension 127 is threaded onto a threaded reduced diameter shank of the spool valve 50 and is disposed in the bore of a second hollow spool valve extension 129 as shown. Positioned in the bore of the spool valve extension 127 is a drain valve means which includes drain valve assembly 132 movable with spool valve 50 and an unseating member 134 which is fixed in axial position relative to the spool valve and drain valve assembly by the overboard drain fitting 20, being affixed in fitting 20 by hub 135 having alternate axial fuel drain slots 60 and flanges 137.

The drain valve assembly 132 includes an inner plug 151 with an axial bore 153 in which hollow plunger 155 carrying a ball check valve 156 is biased by spring 158 against valve seat 152 formed on the spool valve extension 127. Axial bore 153 includes a small diameter bore 155a in fuel flow relation with spool valve bore 120 to receive draining fuel therefrom, as more clearly shown in FIG. 3. The solid line position of the ball check valve 156 represents the closed position in FIG. 3.

During metering of fuel flow from the fuel inlet manifold 30 to the fuel outlet manifold 40 by the metering valve portion 106 of the spool valve, the ball valve 156 will be urged closed against the valve seat 152 by the coil spring 158 and by fuel pressure. The fuel drain valve means in the spool valve bore is thus closed during fuel metering operation of the fuel control valve.

However, when fuel flow from the fuel inlet manifold 30 to the fuel outlet manifold 40 is terminated by closing shut-off seal 90 against sealing surface 100, the drain valve means is openable as follows. When the spool valve 50 is slid forward to the right in FIG. 2 to sealingly engage O-ring seal 90 against sealing surface 100, the drain valve assembly 132 is also slid to the right the same distance. This repositioning of the drain valve assembly will cause it to engage the fixed unseating member 134. The unseating member includes an extension 181 extending axially or longitudinally toward the ball valve 156 and unseats the ball valve against the bias of spring 158 when the valve assembly 132 is thus reposition. To this end, hollow spool valve extension 127 includes an end aperture 184 to accommodate entry of the unseating extension 181 and also to allow draining fuel to flow therethrough when the ball valve is unseated. The draining fuel then flows through axial passages or slots 60 into chamber 62 of drain fitting 20 for discharge back to a fuel reservoir (not shown) via a conduit (not shown) connected to drain fitting 20.

The spool valve 50 includes hollow spool valve extension 129 threaded onto the right-hand end thereof relative to FIG. 2 and another spool valve extension 169 threaded onto the left-hand end thereof relative to FIG. 2. Extensions 129,169 include radially-extending pistons 131,171 providing piston faces 131a, 131b, 171a, 171b.

As shown, the pistons 131,171 are in close sliding fit in annular piston sleeves 180,182 both of which are in fixed position in housing bore 26. Pistons 131,171 include seals 184,186 to minimize hydraulic fluid leakage between chambers 188,190 for piston 131 and chambers 192,194 for piston 171. Suitable seals 196 are provided at other locations between the pistons 131,171 and piston sleeves 180,182 for the same purpose.

Piston sleeves 180,182 include pairs of hydraulic fluid passages 202,204 and 206,208, respectively, for supplying fluid at fluid control pressure $C_1$, $C_2$ and $C_3$, $C_4$ to the chambers 188,190 and 192,194. In particular, fluid passage 202 provides fluid control pressure $C_1$ to chamber 188, passage 204 provides fluid control pressure $C_2$ to chamber 204, passage 206 provides fluid control pressure $C_3$ to chamber 192, and passage 208 provides fluid control pressure $C_4$ to chamber 194.

Piston sleeves 180,182 also include hydraulic fluid passages 210,212 which are in fluid communication with hydraulic fluid passages 214,216 in end sleeves 220,222, respectively. Passages 214,216 in turn communicate with end chambers 224,226 which are connected to return pressure $R_1$, $R_2$ of the hydraulic actuator system as described in more detail hereinbelow. Appropriate oil seals 229 are provided between the housing bore 26, piston sleeve 182 and end sleeve 222.

It is apparent that drain fitting 20 is threadably received in end sleeve 222 and locked in position thereon by locking collar 230.

End sleeve 220 includes an end plug 232 threaded into a threaded bore 234. The end plug 232 supports a tubular array of multiple position proximity sensors 250. The sensors 250 are adapted to sense the position of shaft 252 extending axially from nut 254 threaded onto the small diameter extension 256 of the spool valve 50 as shown for purposes to be explained hereinbelow. The sensors 250 are carried on a support tube 260 threadably engaged to threaded projection 262 on the plug 232.

The left-hand spool valve extension 169 in FIG. 3 carries an annular collar 270 fixedly attached thereto. A first coil spring 272 is positioned between the annular collar 270 and valve member 83 which includes a tubular extension 274 in which the first coil spring 272 is confined. A second coil spring 276 is placed in series with the first coil spring 272 and is positioned between piston sleeve 180 and annular collar 270 as shown. Together acting in series, first and second coil springs 272 and 276 bias the spool valve 50 toward the right in FIG. 2 for purposes to be described herebelow.

It is apparent that suitable oil seals 280 are provided between housing bore 26, piston sleeve 180 and spool valve extension 169 for oil sealing purposes. End sleeve 220 includes an annular flange 220a by which the sleeve is attached to the housing 12 using multiple machine screws 290 (only one shown). End sleeve 222 includes an annular flange 222a for a similar purpose.

Figure 4:
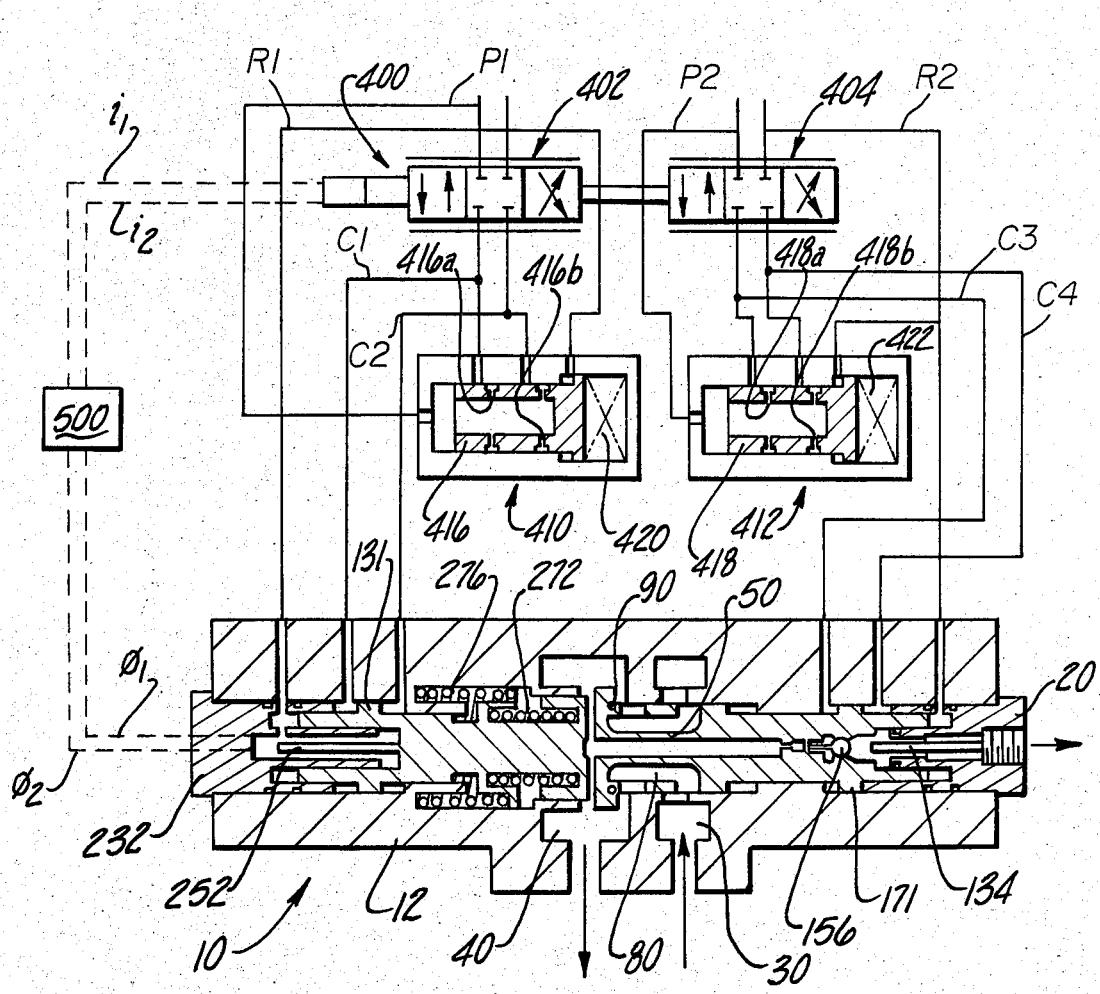
FIG. 4 is a schematic partial view showing the fluid control valve and hydraulic servovalve actuator with shuttle valves therebetween.

With respect to FIG. 4, the fuel control valve 10 is shown in schematic form operatively associated with a hydraulic direct drive servo valve actuator 400. The servo valve actuator 400 includes 4-way operating tandem spool valves 402,404 for controlling hydraulic flow between control pressure lines $C_1$ and $C_2$, supply pressure line $P_1$ and return pressure line $R_1$ for spool valve 402 and control pressure lines $C_3$ and $C_4$, supply pressure line $P_2$ and return pressure line $R_2$ for spool valve 404. The servo valve actuator preferably is constructed in accordance with the principles of pending U.S. patent application Ser. No. 590,243 filed Mar. 16, 1984 entitled "Direct Drive Servovalve And Fuel Control System Incorporating Same" in the names of Dan O. Bauer and Sidney K. Tew of common assignee herewith, now U.S. Pat. No. 4,530,487 the teachings of which are incorporated herein by reference.

Control lines $C_1$ and $C_2$ provide fluid control pressure $C_1$ and $C_2$ to chambers 188,190 in which the piston 131 on spool valve extension 169 is disposed and control lines $C_3$ and $C_4$ to chambers 192,194 in which the piston 171 of spool valve extension 127 is disposed for operating the spool valve 50. Return lines $R_1$ and $R_2$ connect end chambers 224,226 of the fluid control valve 10 to return pressure.

The spool valve 50 can be moved right or left relative to FIG. 2 by varying control pressures $C_1$–$C_3$ as is apparent. In this way, fuel flow through the control valve 10 can be controlled. When hydraulic pressure in lines $C_1$–$C_3$ and $P_1$–$P_2$ is lost by either shut-down of the engine or for other reasons, coil springs 272 and 276 will bias the fuel control spool valve 50 to positively sealingly engage O-ring seal 90 with sealing surface 100 on the valve sleeve 28 and thereby terminate fuel flow to fuel outlet manifold 40 altogether. The same shut-off action would occur upon a loss of electrical signals to the servo valve actuator 400 which would assume a null position.

Shuttle valves 410 and 412 are provided in the control, supply and return lines $C_1$, $C_2$, $P_1$, $P_2$ as shown to allow the fuel control spool valve 50 to close or shut off fuel under biasing action of coil springs 272,276 when there is a loss of electrical power to the servo valve actuator 400.

During normal operation with normal hydraulic pressures in the control, supply and return lines, the shuttle valves 410,412 will be closed as shown in FIG. 4 to separate control lines $C_1$, $C_2$ from supply pressure line $P_1$ and control lines $C_3$, $C_4$ from supply pressure line $P_2$. Pressure of supply pressure lines $P_1$, $P_2$ act against the valve members 416,418 to offset the annular ports 416a, 416b and 418a, 418b relative to control lines $C_1$, $C_2$ and $C_{3,4}$ against the bias of coil springs 420,422. However, in the event the servo valve actuator 400 goes to null as a result of an electrical power failure and supply pressure $P_1$, $P_2$ is lost, the bias of springs 420,422 will bring the ports 416a, 416b and control lines $C_1$, $C_2$ into registry. Similarly, parts 418a, 418b and control lines $C_3$, $C_4$ will be brought into registry. This registering action will allow hydraulic fluid locked in chambers 188,190 and 192,194 of the fuel control valve 10 to vent so that the bias of the coil springs 272,276 can slide the spool valve 250 into position with the O-ring seal 90 sealingly engaged against sealing surface 100. If the shuttle valves 410,412 were not present, the hydraulic fluid in chambers 188,190 and 192,194 would be locked therein when the servo valve actuator 400 is at null from loss of electrical power.

In the fuel control system shown in FIG. 4, the position signals $\phi_1$–$\phi_2$ from proximity sensors 250 in the fuel control valve 10 are fed to the CPU 500. Coil currents $i_1$ and $i_2$ as well as fuel flow velocity signals and other signals representing engine parameters or pilot commands can be fed to the CPU to control the servo valve actuator 400 and thus the fuel control valve 10.

Figure 5:
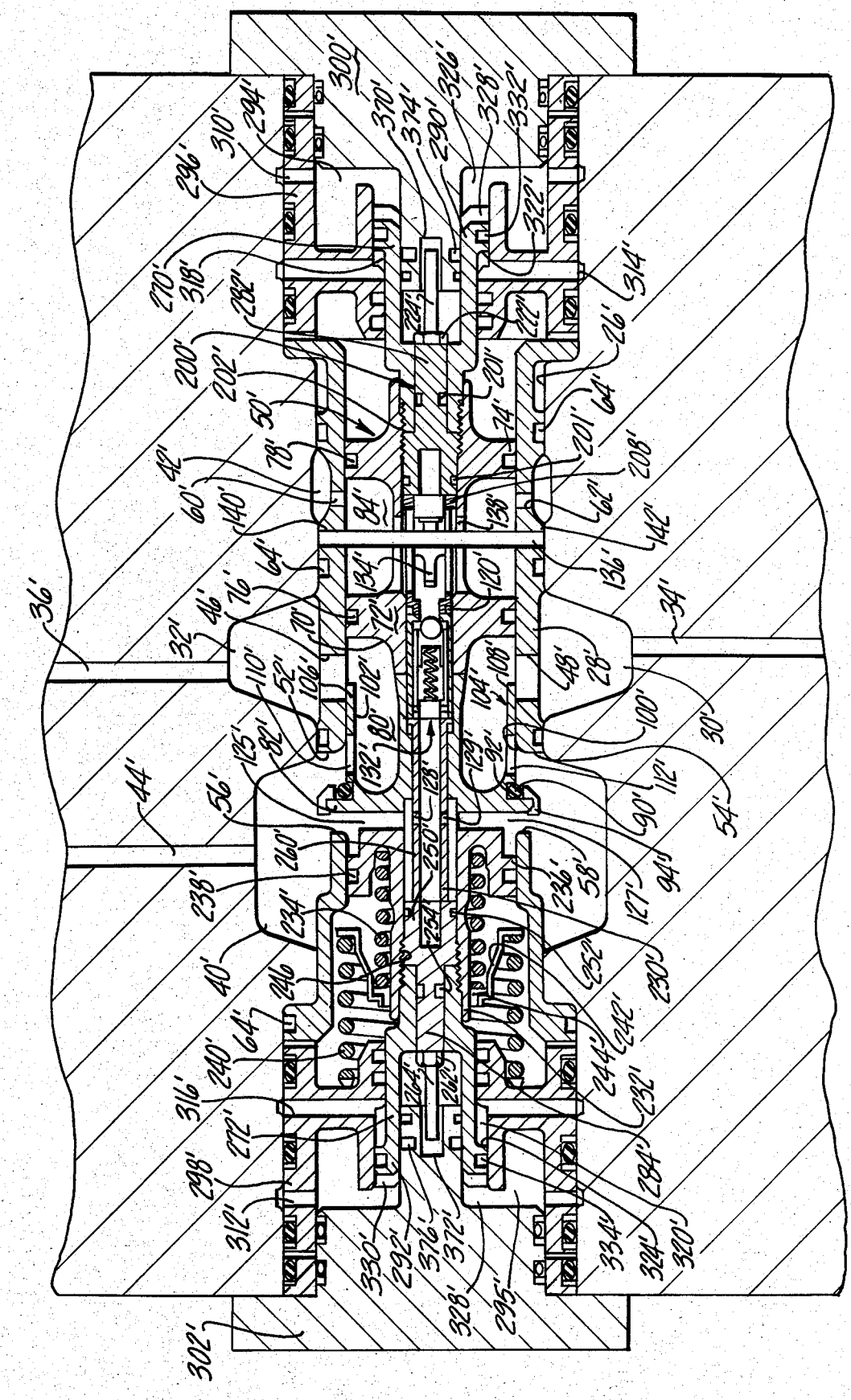
FIG. 5 is a longitudinal cross-sectional view of another control valve embodiment of the invention.
Figure 6:
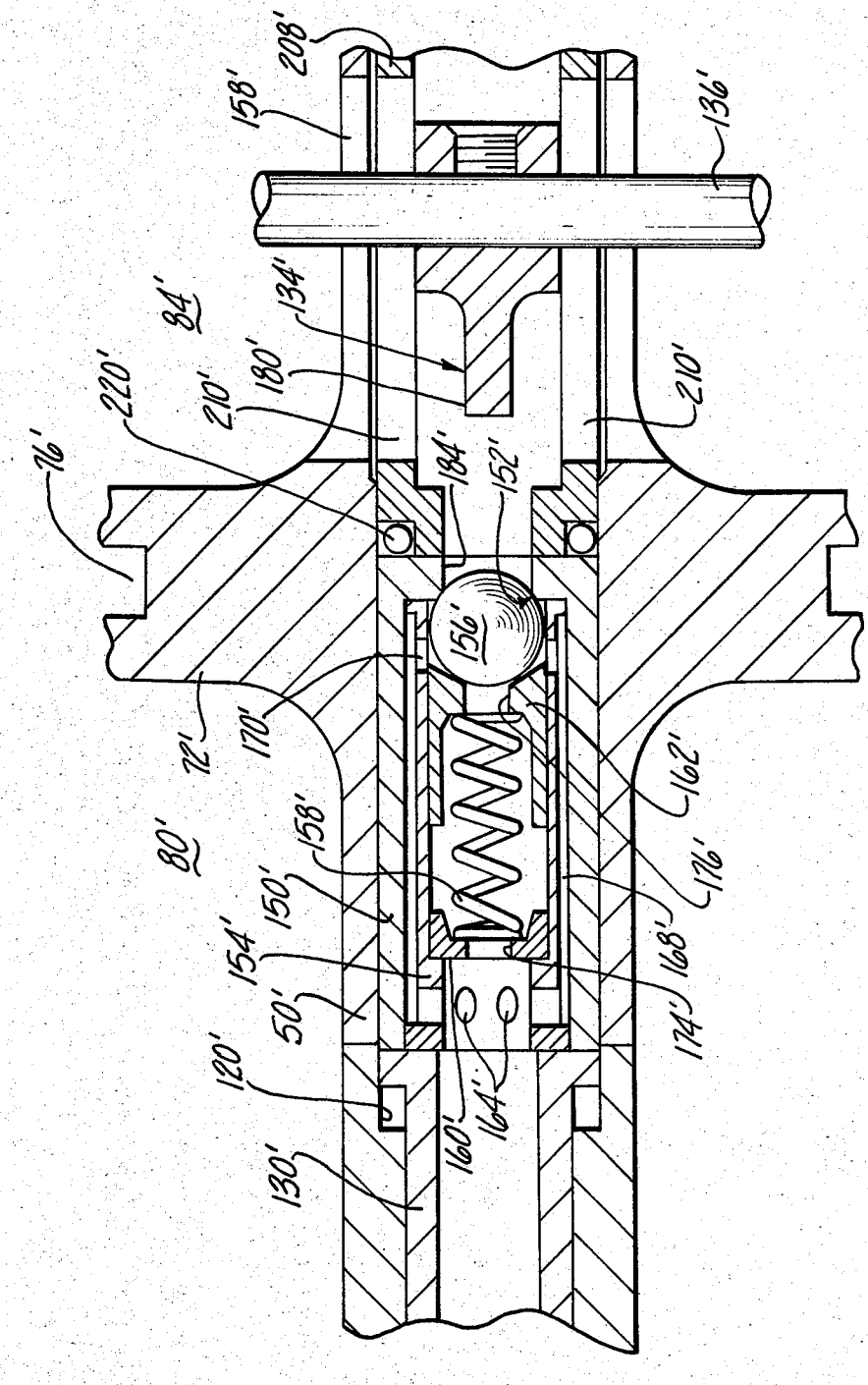
FIG. 6 is an enlarged partial cross-sectional view of the drain valve means of the embodiment of FIG. 5.

FIGS. 5–6 show the inner structure of another embodiment of the fuel control valve in detail. It is apparent that the valve housing or body 12′ has a longitudinal bore 26′ therein in which is received a valve sleeve 28′. The housing bore 26′ and outer periphery of the valve sleeve 28' are complementary configured at spaced locations along the housing bore 26' to form a pair of separate fuel inlet manifolds 30', 32' which are in fuel flow relation with the fuel inlet fittings (not shown) by means of suitable passages 34', 36', a single common fuel outlet manifold 40' which is in fuel flow relation with both fuel inlet manifolds 30', 32' as permitted by the spool valve 50' and with a fuel outlet or discharge fitting (not shown) via passage 44', and a fuel drain manifold 42' which is in fuel flow relation with the fuel outlet manifold 40' in the manner and under certain conditions explained herebelow. The valve sleeve 28' includes a pair of fuel inlet apertures 46', 48', a pair of fuel outlet apertures 52', 54' in fuel flow communication with the respective inlet or outlet manifolds already described. The valve sleeve also includes a first pair of fuel drain apertures 56', 58' in fuel flow relation with the fuel outlet manifold 40' and also a second pair of fuel drain apertures 60', 62' in fuel flow relation with the fuel drain manifold 42'. Multiple seals 64' are provided on valve sleeve 28' to prevent unwanted fuel leakage.

As is apparent, spool valve 50' is positioned in close sliding fit in the housing bore 26'. The spool valve includes a central fuel control portion 70' having radially-extending large diameter lands 72', 74' in sliding fit in the housing bore 26 as shown. The lands 72', 74' each have sealing groove 76', 78' therein to aid in preventing fuel leakage from a first bore portion 80' defined between land 72' and radial shoulder 82' on the left-hand end of the central fuel control portion 70' of the spool valve and a second bore portion 84' between lands 72', 74'. It is apparent that the first bore portion 80' is in fuel flow relation with the fuel inlet manifolds 30', 32' through inlet apertures 46', 48' and fuel outlet manifold 40' through outlet apertures 52', 54' when the spool valve is in the position shown in FIG. 5. Similarly, the second bore portion 84' is in fluid flow relation with the fuel drain manifold 42' through drain apertures 60', 62'.

The radial shoulder 82' of the spool valve includes a resilient O-ring seal 90' in a circumferential groove 92' on the shoulder with the O-ring seal held in the groove by retainer ring 94'. The O-ring seal is engageable against a chamfered sealing surface 100' machined on the valve sleeve 28' to provide a positive seal to shut off fuel flow from the first bore portion 80' to the fuel outlet manifold 40' when the spool valve is slid to the right in FIG. 5 as will be described herebelow.

The radial shoulder 82' also carries dual arcuate extensions 102', 104' extending longitudinally therefrom in cantilever fashion. Each extension includes an arcuate metering portion 106', 108' slidable in close fit in housing bore 26' past the fuel inlet apertures 46', 48' to meter fuel flow therethrough. Each metering valve also includes a secondary aperture or slot 110', 112' between the metering portions 106', 108' and radial shoulder 82' to provide a flow path for fuel from the first bore portion 80' to the fuel outlet manifold 40' through outlet apertures 52', 54' as fuel is metered.

The central fuel control portion 70' of the spool valve includes a longitudinal bore 120' which is in fuel flow relation with the fuel outlet manifold 40' via the first pair of fuel drain apertures 56', 58' in valve sleeve 28', drain apertures 125', 127' in the spool valve and a third pair of fuel drain apertures 128', 129' in adjustment tube 130' to be described hereafter. Fuel thus can flow or drain from the fuel outlet manifold 40' into the spool valve bore 120'. Positioned in the bore 120' is a drain valve means which includes drain valve assembly 132' movable with the spool valve and unseating member 134' which is fixed in position relative to the spool valve and drain valve assembly by a cross-pin 136' extending through a slot 138' in the spool valve, the second bore portion 82' and into apertures 140', 142' in the valve sleeve 28'.

The drain valve assembly 132' comprises an outer sleeve 150' forming a valve seat 152' and an inner sleeve 154' inside of which a check ball valve 156' is spring biased against valve seat 152' by coil spring 158' and spring containment members 160', 162'. The ends of outer and inner sleeves 150', 154' distal (upstream) from the ball valve 156' are open to admit fuel draining from the fuel outlet manifold 40' into the spool valve bore. The inner sleeve 154' includes a plurality of circumferentially spaced holes 164'0 to admit fuel entering the open sleeve ends into annular chamber 168' formed between the outer and inner sleeves and near the opposite end (downstream end) a plurality of circumferentially spaced holes 170' to discharge draining fuel against the ball valve 156'. Central holes 174', 176' are provided in spring containment members 160', 162', respectively, for this same purpose.

During metering of fuel flow from the fuel inlet manifolds 30', 32' to the fuel outlet manifold 40' by the metering valves on the spool valve, the ball valve 156' will be urged closed against the valve seat 152' by the coil spring 158' and by the fuel pressure. The fuel drain valve means is thus closed during fuel metering operation of the fuel control valve.

However, when fuel flow from the fuel inlet manifolds 30', 32' to the fuel outlet manifold 40' is terminated by closing shut-off valve 90' against sealing surface 100', the drain valve means is openable as follows. When the spool valve is slid toward the right in FIG. 5 to sealingly engage O-ring seal 90' against sealing surface 100', the drain valve assembly 132' is also slid to the right the same distance. This repositioning of the drain valve assembly will cause it to engage the fixed unseating member 134'. The unseating member includes an extension 180' extending longitudinally toward the ball valve 156' and unseats the ball valve against the bias of spring 158' when the valve assembly is thus repositioned. To this end outer sleeve 150' includes an end aperture 184' to accommodate entry of the unseating extension 180' and also to allow fuel flow therethrough when the ball valve is unseated.

The draining fuel flows through the open drain valve assembly out of the spool bore 120' through slots 138' in the reduced diameter portion of the spool valve between lands 70', 72' and into the second bore portion 82' for discharge to the drain manifold 42' via drain apertures 60', 62' in the valve sleeve.

The position of the unseating member 134' is not adjustable along the length of the spool bore 120'. In particular, on the right end of the central fuel control portion 70' of the spool valve an adjusting nut member 200' having an externally threaded portion 202' is threaded into a threaded section 206' of the spool bore into abutment with a cylindrical hollow adjusting sleeve 208' which in turn is in contact with the end of outer sleeve 150' of the drain valve assembly. The adjusting sleeve 208' receives the unseating member 134' in the interior thereof as shown and includes upper and lower slots 210' to accommodate the cross-pin 136' and allow adjustable sliding movement of the drain valve assembly in the spool bore. An O-ring seal 220' is positioned between outer drain valve sleeve 150' and adjusting sleeve 208' to prevent fuel from by-passing the drain valve assembly. Adjusting nut member 200' includes multiple seals 201' to prevent fuel leakage. Lock nut 222' is provided on a shaft 224' extending axially or longitudinally from the adjusting nut.

On the left end of the central fuel control portion 70' of the spool valve is an annular spool valve extension 230' having an annular sleeve 232'. A first coil spring 234' is carried on sleeve 232'. A land 236' of the spool valve extension 230' is in sliding fit in the housing bore 26' and includes seal 238'. A second coil spring 240' is placed in series with the first spring 234' by means of annular collar 242' having a hub 244' receiving the annular sleeve 232' of the spool valve and abutting the first coil spring. Together acting in series, first and second springs 234' and 240' bias the valve spool toward the right in FIG. 5 for purposes to be described herebelow.

The annular sleeve 232' of the valve spool includes an inner threaded portion adapted to threadably receive an externally threaded adjusting nut member 250' having seals 252', 254'. The inner end of the adjusting nut member 250' abuts an adjusting tube 130' which as shown engages the open ends of outer and inner sleeves 150', 154' of the drain valve assembly 132' in adjusting relation. A lock nut 262' is provided on a shaft 264' extending axially from the adjusting nut member 250'.

By threadably adjusting nut members 200', 250', the position of the drain valve assembly 132' can be changed relative to the fixed unseating member 134'.

Threaded into inner threaded portions 206', 246' of the spool valve bore are end members 270', 272' each having inner threaded end with axial bores adapted to receive the axially-extending stems 282', 284' of the adjusting nut members 200', 250' as shown and having outer larger diameter ends forming hydraulic piston members 290', 292'. The pistons 290', 292' are disposed respectively in chamber 294', 295' formed by annular piston sleeves 296', 298' and end plugs 300', 302'.

Annular piston sleeves 296', 298' include a pair of hydraulic fluid control passages 310', 312' and a pair of hydraulic supply passages 314', 316'. The control passages 310', 312' communicate with a small annular hydraulic chamber 318', 320', formed by the piston sleeves and a small annular face 322', 324' on the piston members. The supply passages 314', 316' communicate with a larger hydraulic chamber 326', 328' formed by piston sleeves 296', 298', plugs 300', 302' and larger face 328', 330' on the piston members as shown. It is apparent that the piston members 290', 292' include appropriate seals 332', 334' separating the small hydraulic chamber from the larger hydraulic chamber. And, annular piston sleeves 296', 298' include inner seals and outer seals. Plugs 300', 302' include inner seals on the reduced diameter portion and outer seals on the intermediate diameter portion as shown. As will be more fully explained herebelow, hydraulic control passages 310', 312' and supply passages 314', 316' are connected to respective control and supply lines of a direct drive hydraulic servovalve actuator or other suitable external source of hydraulic pressure.

The second coil spring 240' which biases the spool valve to engage the shut-off O-ring seal 90' against sealing surface 100' on the valve sleeve 28' is positioned and abuts the annular collar 242' at one end and annular piston sleeve 298' at the other end.

Shafts 224' and 264' referred to hereinabove with respect to the adjusting means for the drain valve means in the spool bore 120' extend axially into axial passages 370', 372' in end plugs 300', 302'. Aligned along the passages 370', 372' in the end plugs are proximity sensors 374', 376' which detect or sense the location of the shafts and thus the position of the spool valve. Output signals $\phi_1$ and $\phi_2$ from the sensors 374', 376' are sent to a central processing unit CPU (FIG. 4) described hereinabove.

While certain specific and preferred embodiments of the invention have been described in detail hereinabove, those skilled in the art will recognize that various modifications and changes can be made therein within the scope of the appended claims which are intended to include equivalents of such embodiments.

I claim:

1. A fluid flow control valve comprising a valve housing means having a bore with a fluid inlet means, fluid outlet means and fluid drain means in fluid flow communication therewith, a valve means slidably disposed in said bore, said valve means having fluid metering valve means slidable therewith for metering fluid flow between said fluid inlet means and fluid outlet means, fluid shut-off valve means slidable therewith for terminating fluid flow to said fluid outlet means and further having a longitudinal valve bore in fluid flow communication with said fluid outlet means and said fluid drain means, drain valve opening means disposed in fixed position in the valve bore, and a fluid drain valve means in the valve bore movable with the valve means for opening by the drain valve opening means when fluid flow to said fluid outlet means is terminated by said shut-off valve means so that fluid can drain from said fluid outlet means to said fluid drain means through the valve bore and closeable during metered fluid flow to the fluid outlet means past said metering valve means, and means for sliding said valve means to control fluid flow.

2. The valve of claim 1 wherein the valve housing means includes a valve body with a longitudinal bore therein and a valve sleeve disposed in the bore of the valve body, said valve sleeve having a longitudinal sleeve bore, said valve means being slidably disposed in said sleeve bore and said valve sleeve together with said valve body forming fluid inlet manifold means and, fluid outlet manifold means in fluid flow communication with said valve sleeve bore.

3. The valve of claim 1 wherein the valve means separates the bore of said valve housing means into a first bore portion and second bore portion, said first bore portion being in fluid flow communication with said fluid inlet means and said fluid outlet means and said second bore portion being in fluid flow communication between said fluid drain means and the valve bore such that fluid can flow from the fluid outlet means to the fluid drain means through the valve bore and the second bore portion when said fluid drain valve means is open.

4. The valve of claim 3 wherein the first bore portion and second bore portion are formed by spaced apart large diameter lands on the valve means in sliding fit in the bore of said valve housing means and smaller diameter portions between said lands.

5. The valve of claim 1 wherein the fluid metering valve means comprises a valve member extending longitudinally from the valve spool in close sliding fit in the bore of the valve housing means and slideable past the fluid inlet means to meter fluid flow therethrough and aperture means in the valve member slidable past the fluid outlet means for providing a fluid flow path thereto.

6. The valve of claim 1 wherein the fluid shut-off valve means comprises a sealing means carried on the valve means and positively sealable against a sealing surface on the valve housing means by sliding said valve means.

7. The valve of claim 1 wherein the fluid drain valve means comprises a drain valve assembly disposed in the bore of the valve means for movement therewith and including a valve member, valve seat and spring means biasing the valve member closed against the valve seat during metered fluid flow to the fluid outlet means, and further comprising an unseating member disposed in the bore of the valve means in fixed position relative to the drain valve assembly and engageable therewith to unseat the valve member and open said drain valve means when fluid flow to said fluid outlet means is terminated so that fluid can drain therefrom to the fluid drain means through the bore of the valve means.

8. The valve of claim 1 wherein the means for sliding the valve means comprises opposite end portions thereof forming piston means which are subjected to fluid pressure from an external fluid pressure source.

9. The valve of claim 1 wherein the means for sliding the valve means further includes spring means in the bore of the valve housing means biasing the valve means in a direction to close the fluid shut-off valve means to terminate fluid flow to the fluid outlet means.

10. The valve of claim 1 which further includes means in the valve bore for adjustably positioning the drain valve means therein relative to the drain valve opening means.

11. The valve of claim 1 which further includes pin means in the valve housing means extending through the valve means for fixedly supporting the drain valve opening means in the valve bore.

12. The valve of claim 1 wherein the drain valve means comprises a ball check valve means.

13. A fuel control valve comprising a valve housing means having a longitudinal bore with a fuel inlet means, fuel outlet means and fuel drain means in fuel flow relation therewith, a spool valve means slidably disposed in said bore and forming a fuel control bore portion in said bore in fuel flow relation with said fuel inlet means and fuel outlet means, said spool valve means having metering valve means slidable therewith relative to said fuel inlet means to meter fuel flow into the fuel control bore portion, shut-off valve means slidable therewith relative to said fuel outlet means for interrupting the fuel flow relation between the fuel control bore portion and fuel outlet means and further having a longitudinal spool bore in fuel flow relation with said fuel outlet means and said fuel drain means, a drain valve assembly disposed in the spool bore for movement with the spool valve means and including a valve member, valve seat, means urging the valve member closed against the valve seat during metered fuel flow to the fuel outlet means, an unseating member longitudinally disposed in the spool bore in fixed position relative to the spool valve means and engageable with the valve member to unseat same and open said drain valve assembly when fuel flow to said fuel outlet means is interrupted so that fuel can drain from the fuel outlet means to the drain means through the spool bore, and further comprising means for sliding the spool valve means.

14. The valve of claim 13 wherein the fluid metering valve means comprises a valve member extending longitudinally from the valve spool means in sliding fit adjacent the bore of the valve housing means and slideable past the fluid inlet means to meter fluid flow therethrough.

15. The valve of claim 13 wherein the fluid shut-off valve means comprises an O-ring sealing means carried on the valve spool means and positively sealable against a sealing surface on the valve housing means to terminate fluid flow to the fluid outlet means.

16. The valve of claim 13 the drain valve means includes a ball check valve as the valve member.

17. The valve of claim 13 which further includes means in the spool bore for adjustably positioning the drain valve assembly in the spool bore relative to the unseating member.

18. The valve of claim 17 wherein the adjusting means is threaded into a threaded portion of said spool bore into contact with said drain valve assembly for adjustably positioning same.

19. The valve of claim 18 wherein one adjusting means is threaded into one end of said spool bore and another of said adjusting means is threaded into the other end to contact the drain valve assembly at opposite ends thereof.

20. The valve of claim 13 which further includes pin means in the valve housing means extending through a slot in said spool valve means, said pin means supporting the unseating member thereon.

21. The valve of claim 13 wherein the means for sliding the spool valve means comprises portions thereof forming piston means which are subjected to fluid pressure from an external fluid pressure source.

22. The valve of claim 13 wherein the means for sliding the spool valve means further includes spring means in the bore of the valve housing means biasing the spool valve means in a direction to close the fluid shut-off valve means to terminate fluid flow to the fluid outlet means.

23. The valve of claim 22 wherein the spring means biases the spool valve means in the direction parallel with the longitudinal axes of the spool bore and housing bore.

* * * * *